US011827488B2

(12) United States Patent
Murata

(10) Patent No.: US 11,827,488 B2
(45) Date of Patent: Nov. 28, 2023

(54) SHEET FEEDING APPARATUS, IMAGE FORMING APPARATUS, AND IMAGE READING APPARATUS

(71) Applicant: CANON KABUSHIKI KAISHA, Tokyo (JP)

(72) Inventor: Wataru Murata, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 234 days.

(21) Appl. No.: 17/503,403

(22) Filed: Oct. 18, 2021

(65) Prior Publication Data

US 2022/0185608 A1    Jun. 16, 2022

(30) Foreign Application Priority Data

Dec. 10, 2020   (JP) .................................. 2020-204731

(51) Int. Cl.
*B65H 3/06*     (2006.01)
*B65H 7/20*     (2006.01)
*H04N 1/00*     (2006.01)

(52) U.S. Cl.
CPC ............. *B65H 7/20* (2013.01); *B65H 3/0607* (2013.01); *B65H 3/0684* (2013.01); *H04N 1/00602* (2013.01); *H04N 1/00615* (2013.01); *H04N 1/00649* (2013.01)

(58) Field of Classification Search
CPC .. B65H 3/0607; B65H 3/0615; B65H 3/0684; B65H 7/20; H04N 1/00602; H04N 1/00615; H04N 1/00649
USPC .................................................. 271/109, 264
See application file for complete search history.

(56) References Cited

U.S. PATENT DOCUMENTS

| 6,651,971 | B2* | 11/2003 | Tsuei ................... B65H 3/5261 271/109 |
| 8,840,103 | B2* | 9/2014 | Fukumoto .............. B65H 3/047 271/10.04 |
| 9,873,576 | B2* | 1/2018 | Kondo ..................... B65H 1/04 |
| 10,155,634 | B2 | 12/2018 | Murata |
| 10,633,205 | B2 | 4/2020 | Murata |
| 10,723,575 | B2 | 7/2020 | Chiba et al. |
| 10,955,786 | B2 | 3/2021 | Murata |
| 2015/0203307 | A1* | 7/2015 | Tanaka ................. B65H 3/5215 271/121 |
| 2016/0327897 | A1* | 11/2016 | Kondo ............... G03G 15/6529 |
| 2018/0141768 | A1* | 5/2018 | Ikegami ............... B65H 3/0669 |

FOREIGN PATENT DOCUMENTS

| JP | 2004182417 A | * | 7/2004 | |
| JP | 2014-169166 A |  | 9/2014 | |
| JP | 2017-052574 A |  | 3/2017 | |
| JP | 2019059580 A | * | 4/2019 | .............. B65H 1/04 |

* cited by examiner

*Primary Examiner* — Leslie A Nicholson, III
(74) *Attorney, Agent, or Firm* — Venable LLP

(57) ABSTRACT

The rotation of a lifting and lowering plate 56 is controlled such that, in a case where the height of the sheet loaded in a manual feed tray 50 is maximum, a feed roller 51 abuts the sheet at a first abutment position at a first moving velocity slower than a second moving velocity at a position upstream in the movement direction of the feed roller 51 from the first abutment position, and, in a case where the height of the sheet loaded in the manual feed tray 50 is minimum, the feed roller 51 abuts the sheet at a second abutment position at a third moving velocity slower than the first moving velocity at the first abutment position.

7 Claims, 12 Drawing Sheets

SHEET FEEDING APPARATUS, IMAGE FORMING APPARATUS, AND IMAGE READING APPARATUS

BACKGROUND OF THE INVENTION

Field of the Invention

The present invention relates to an image forming apparatus such as an electrophotographic copying machine, an electrophotographic printer, or an inkjet printer that forms an image on a sheet, and to a sheet feeding apparatus suitable for an image reading apparatus such as a scanner that reads the image on the sheet.

Description of the Related Art

The image forming apparatus has a built-in sheet feeding apparatus that uses a feed roller to feed a sheet, which is loaded in a stacking portion, to an image forming portion. The following two configurations, for example, exist as configurations in which a sheet is fed by a sheet feeding apparatus. A first configuration, as disclosed in Japanese Patent Application Laid-Open No. 2017-52574, is a configuration in which a feed roller moves toward a sheet loaded in the stacking portion, and in which feeding is performed with the feed roller abutting the sheet. A second configuration, as disclosed in Japanese Patent Application Laid-Open No. 2014-169166, is a configuration in which a stacking portion in which a sheet is loaded moves toward a feed roller, and in which feeding is performed with the feed roller abutting the sheet.

Here, when the feed roller and the sheet abut each other, a collision sound is generated by the collision therebetween. In contrast, Japanese Patent Application Laid-Open No. 2014-169166 discloses a configuration in which the movement of the stacking portion is controlled such that the moving velocity of the stacking portion is decelerated before the feed roller abuts the sheet. Accordingly, the collision sound generated by the collision between the feed roller and the sheet is reduced.

Nevertheless, when the feed roller and the sheet collide, even when the collision occurs at the same velocity, the size of the collision sound generated varies according to the number of sheets loaded in the stacking portion. In other words, when there is a small number of loaded sheets, because the dampening effect afforded by the sheet is diminished, there tends to be a large collision sound in comparison with when there is a large number of loaded sheets. In order to improve usability by making the sheet feeding apparatus quieter, a configuration is desirable that enables the collision sound between the feed roller and the sheet to be reduced even when there is a small number of loaded sheets.

SUMMARY OF THE INVENTION

According to the present invention, it is desirable to provide a sheet feeding apparatus that makes it possible to reduce the collision sound between the feed roller and the sheet even when there is a small number of sheets loaded in the stacking portion.

A representative configuration for a sheet feeding apparatus according to the present invention configured to achieve the abovementioned purpose has: a stacking portion in which a sheet are loaded; a feed roller that abuts the sheet loaded in the stacking portion and that feeds the sheet; a rotating member that supports the feed roller and that rotates between an abutment position in which the feed roller abuts the sheet loaded in the stacking portion and a standby position in which the feed roller is separated from the sheet loaded in the stacking portion and waits to start sheet feeding; a biasing member that applies a force to the rotating member in a direction in which the feed roller is oriented from the standby position toward the abutment position; and a cam member that moves the rotating member between the abutment position and the standby position, wherein the cam member controls the rotation of the rotating member by abutting the rotating member so as to move the rotating member against the biasing force of the biasing member from the abutment position to the standby position, and in a case where the height of the sheet loaded in the stacking portion is maximum when the feed roller moves from the standby position to the abutment position in order to feed the sheet, the feed roller abuts the sheet at a first abutment position at a first moving velocity slower than a second moving velocity at a position upstream in the movement direction of the feed roller from the first abutment position, and, in a case where the height of the sheet loaded in the stacking portion is minimum, the feed roller abuts the sheet at a second abutment position at a third moving velocity slower than the first moving velocity at the first abutment position.

Further features of the present invention will become apparent from the following description of exemplary embodiments (with reference to the attached drawings).

DESCRIPTION OF THE EMBODIMENTS

<Image Forming Apparatus>

First, the overall configuration of an image forming apparatus provided with a sheet feeding apparatus according to the present invention will be described hereinbelow with reference to the drawings along with the operation of the image forming apparatus during image formation. Note that the dimensions, material properties, shapes, and relative arrangement, and the like, of the constituent components described hereinbelow do not, unless specified otherwise, limit the scope of the invention thereto.

An image forming apparatus A according to the present embodiment is an intermediate tandem-type image forming apparatus that forms an image by transferring toner in four colors, namely, yellow (Y), magenta (M), cyan (C), and black (K) to an intermediate transfer belt and then transferring an image to a sheet. Note that, in the following description, although Y, M, C, and K are assigned as subscripts to the members using the toners of each of the foregoing colors, the configurations and operations of each member are substantially the same except for the fact that the colors of the toners being used are different, and hence the subscripts are suitably omitted except in cases where differentiation is required.

Figure 1:
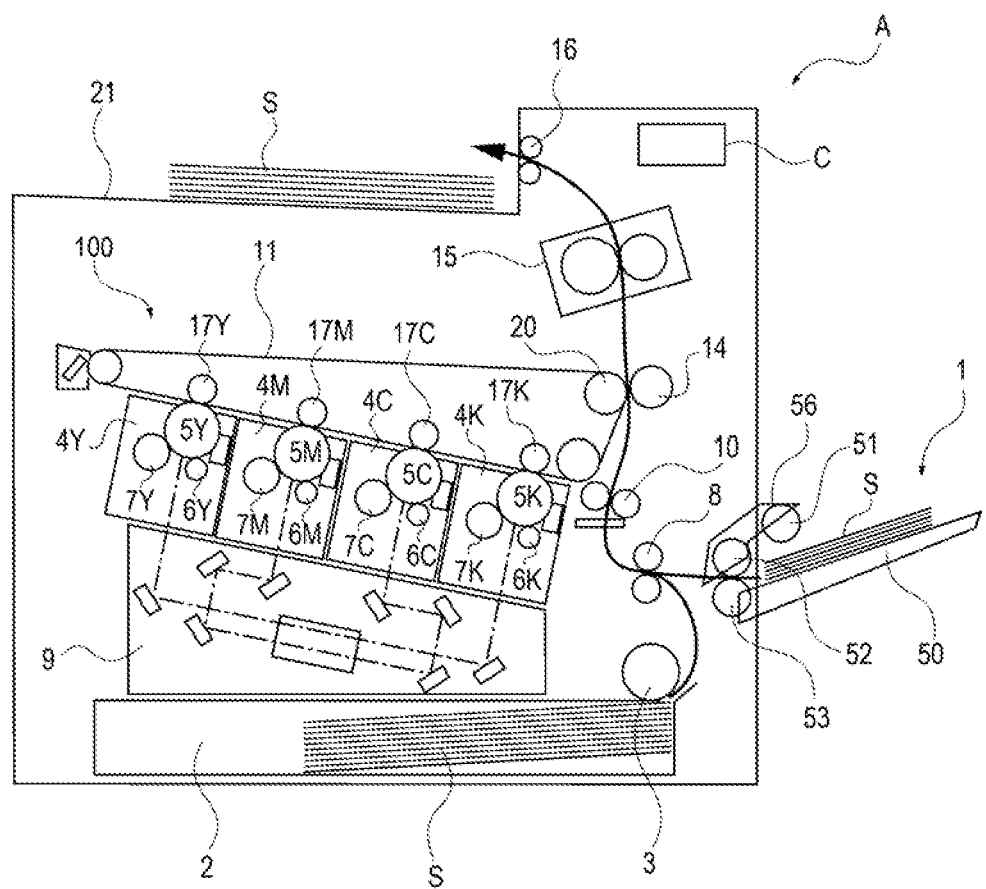
FIG. 1 is a cross-sectional schematic diagram of an image forming apparatus according to the present embodiment.

FIG. 1 is a cross-sectional schematic diagram of the image forming apparatus A. As illustrated in FIG. 1, the image forming apparatus A is provided with an image forming portion 100 that forms an image on a sheet S. The image forming portion 100 is provided with process cartridges 4 (4Y, 4M, 4C, and 4K), a laser scanner unit 9, primary transfer rollers 17 (17Y, 17M, 17C, and 17K), an intermediate transfer belt 11, a secondary transfer roller 14, and a secondary transfer counter roller 20.

The respective process cartridges 4 are each configured to be detachably attached to the image forming apparatus A. The respective process cartridges 4 are provided with photosensitive drums 5 (5Y, 5M, 5C, and 5K), charging rollers 6 (6Y, 6M, 6C, and 6K), and development sleeves 7 (7Y, 7M, 7C, and 7K).

The image forming operation will be described next. First, upon receiving an image formation job signal, the controller C conveys a sheet S, which is loaded and stored in a sheet cassette 2, to a registration roller 10 by means of a feed roller 3 and a conveying roller 8. Furthermore, when the sheet S is fed from a manual feed tray 50, the sheet S loaded in the manual feed tray 50 is conveyed to the registration roller 10 by a feed roller 51, a conveying roller 52, and the conveying roller 8.

Here, the registration roller 10 is stopped when the sheet S is being conveyed to the registration roller 10. In this state, the sheet S is pushed into the nip portion of the registration roller 10 by the conveying roller 8, thereby correcting the sheet S such that its leading edge is aligned. The registration roller 10 rotates at a predetermined timing to convey the sheet S to a secondary transfer portion which is formed from the secondary transfer roller 14 and the secondary transfer counter roller 20.

Meanwhile, the surface of the photosensitive drum 5Y is first charged in the image forming portion 100 by the charging roller 6Y Thereafter, the laser scanner unit 9 irradiates the surface of the photosensitive drum 5Y with laser light according to the image data inputted from an external apparatus. An electrostatic latent image that corresponds to the image data is thus formed on the surface of the photosensitive drum 5Y.

Subsequently, yellow toner is made, by the development sleeve 7Y, to adhere to the electrostatic latent image formed on the surface of the photosensitive drum 5Y, thereby forming a yellow toner image on the surface of the photosensitive drum 5Y. Due to a bias being applied to the primary transfer roller 17Y, the toner image formed on the surface of the photosensitive drum 5Y undergoes primary transfer to the intermediate transfer belt 11.

Through a similar process, magenta, cyan, and black toner images are also formed on the photosensitive drums 5M, 5C, and 5K. Further, due to a bias being applied to the primary transfer rollers 17M, 17C, and 17K, toner images thereof are transferred in a superposed manner to the yellow toner image on the intermediate transfer belt 11. A full-color toner image is thus formed on the surface of the intermediate transfer belt 11.

The intermediate transfer belt 11 moves circumferentially in accordance with the rotation of the secondary transfer counter roller 20. As the intermediate transfer belt 11 carrying the full-color toner image moves, the toner image is sent to the secondary transfer portion. Further, in the secondary transfer portion, the toner image on the intermediate transfer belt 11 is transferred to the sheet S by applying a bias to the secondary transfer roller 14.

Next, the sheet S to which the toner image has been transferred is conveyed to a fixing apparatus 15 and undergoes heating and pressurization treatments in the fixing apparatus 15, thereby fixing the toner image on the sheet S to the sheet S. Subsequently, the sheet S to which the toner image has been fixed is discharged by a discharge roller 16 to a discharge portion 21.

<Tray Feeding Portion>

Next, the configuration of the tray feeding portion 1, which feeds a sheet S loaded in the manual feed tray 50, will be described as a sheet feeding apparatus.

Figure 2:
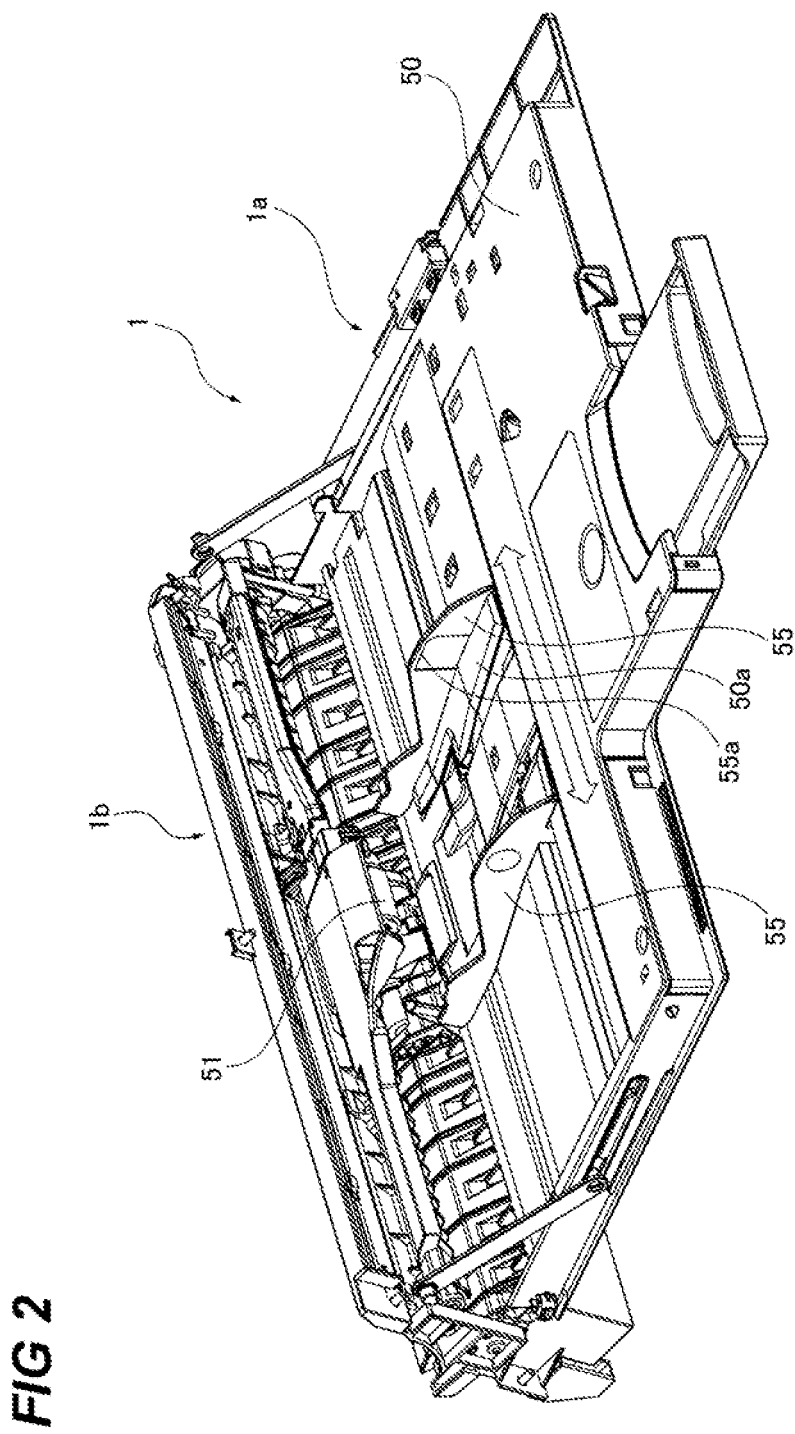
FIG. 2 is an overall perspective view of a tray feeding portion according to the present embodiment.
Figure 3:
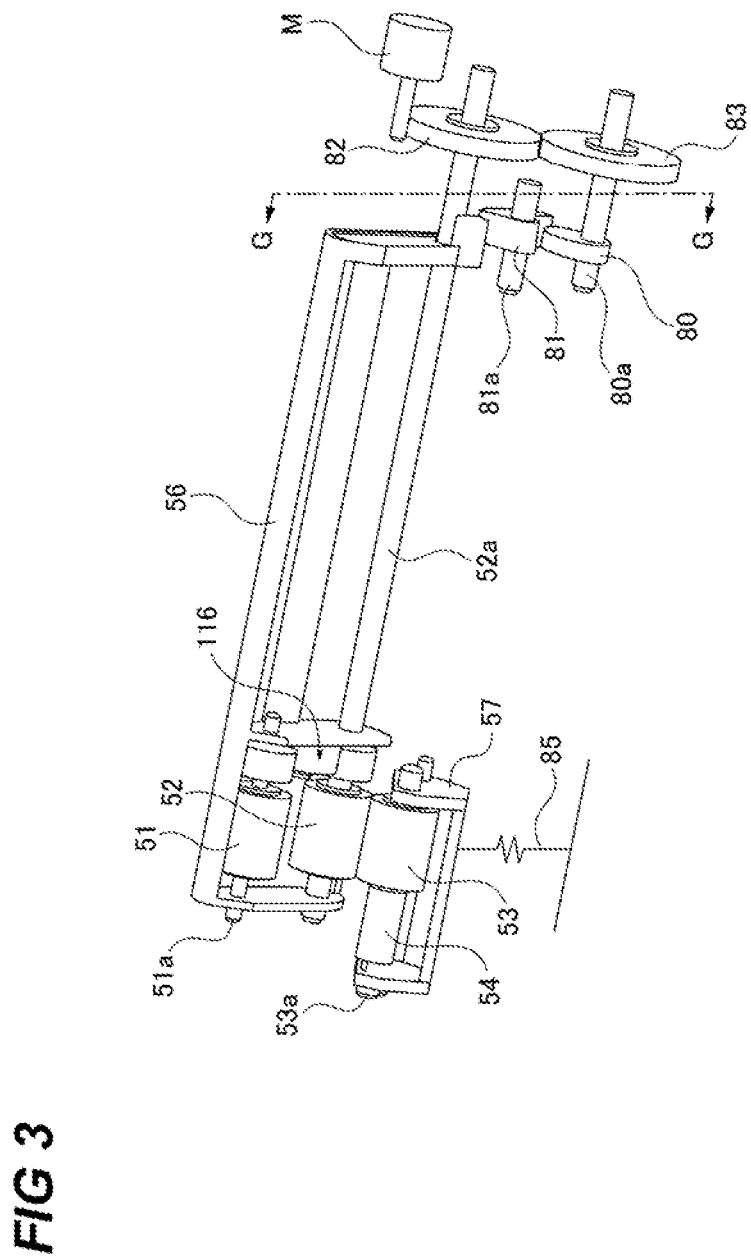
FIG. 3 is a perspective schematic diagram of the tray feeding portion according to the present embodiment.
Figure 4:
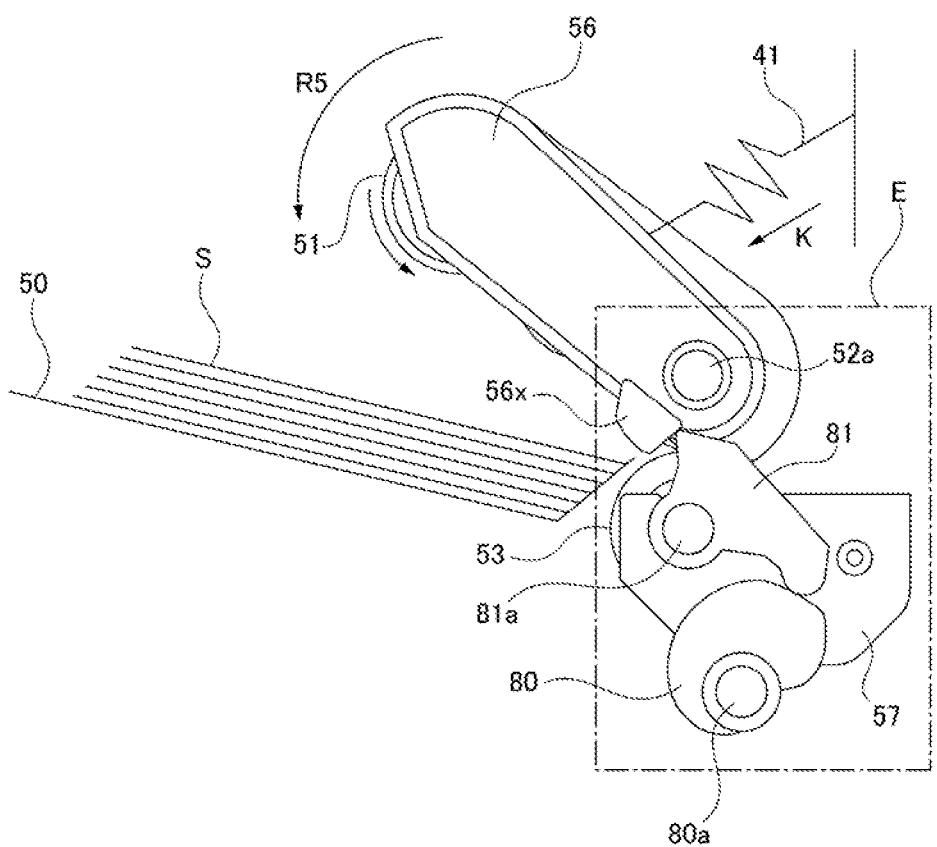
FIG. 4 is a cross-sectional schematic diagram of the tray feeding portion according to the present embodiment.
Figure 5:
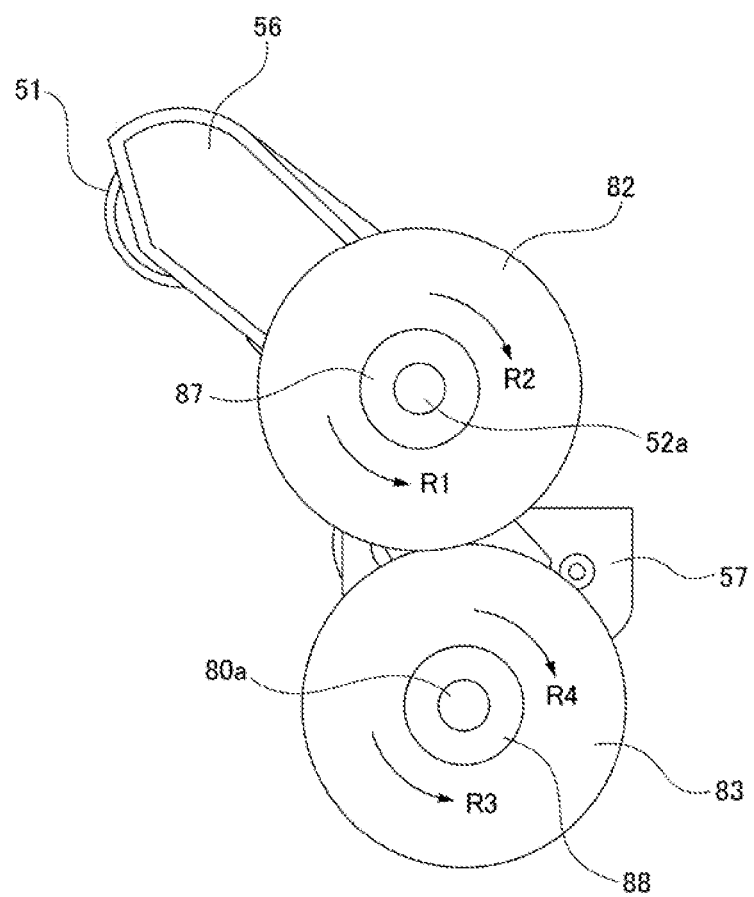
FIG. 5 is a lateral schematic diagram of the tray feeding portion according to the present embodiment.

FIG. 2 is a perspective view of the whole of the tray feeding portion 1. FIG. 3 is a perspective schematic diagram of the tray feeding portion 1. FIG. 4 is a cross-sectional schematic diagram in which the tray feeding portion 1 is split using a cross-section G-G illustrated in FIG. 3. FIG. 5 is a lateral schematic diagram of the tray feeding portion 1.

As illustrated in FIG. 2, the tray feeding portion 1 is configured from a tray portion 1a in which a sheet S is loaded, and a feeding portion 1b that feeds the sheet S loaded in the tray portion 1a. The tray portion 1a is provided with a manual feed tray 50 (stacking portion) in which the sheet S is loaded, and a regulating plate 55 (regulating member) that regulates the position of the end, in the width direction (the lateral end), of the sheet S loaded in the manual feed tray 50. The regulating plate 55 is capable of moving by sliding in the width direction of the sheet S relative to the manual feed tray 50 and is capable of regulating the position of the ends of sheets S of various sizes.

Furthermore, the regulating plate 55 is provided, on the side which regulates the position of the end of the sheet S, with a line 55a indicating the height of the sheet S that can be fed from the tray feeding portion 1, that is, a line 55a that indicates the position of the upper surface of the sheets S when the maximum amount of sheets S is loaded in the manual feed tray 50, and that indicates the maximum height of the sheets S that can be loaded in the manual feed tray 50. Here, the state in which the height of the sheet S loaded in the manual feed tray 50 is maximum is the state in which the height from the sheet loading surface 50a of the manual feed tray 50 that the tray feeding portion 1 is capable of feeding is maximum.

In the present embodiment, the line 55a indicating the height of the sheet S is provided in a position approximately 11 mm upward from the upper surface of the manual feed tray 50.

As illustrated in FIGS. 3 and 4, the tray feeding portion 1 has a feed roller 51 that abuts the sheet S loaded in the manual feed tray 50 and feeds the sheet S, and a conveying roller 52 that conveys the sheet S fed by the feed roller 51. Further, the tray feeding portion 1 has a separation roller 53 that presses against the conveying roller 52 to form a separation nip portion, and that separates, one by one, sheets S that have been multi-page fed in the separation nip portion.

The feed roller 51 is rotatably supported on a feed roller shaft 51a, which is supported by a lifting and lowering plate 56 (rotating member). In other words, the lifting and lowering plate 56 supports the feed roller 51 via the feed roller shaft 51a. The lifting and lowering plate 56 is rotatably supported with respect to a conveying roller shaft 52a, which is the axis of rotation of the conveying roller 52.

A conveyance gear 82 is also provided at one end of the conveying roller shaft 52a. As illustrated in FIG. 5, a one-way clutch 87 is press-fitted into the center of the conveyance gear 82. The one-way clutch 87 transmits the driving force to the conveying roller shaft 52a when the conveyance gear 82 rotates in the R1 direction illustrated in FIG. 5 through the driving force of the motor M (drive source) that rotatably drives the cam member 80, and idles without transmitting the driving force to the conveying roller shaft 52a upon rotation in the R2 direction illustrated in FIG. 5.

When the conveying roller shaft 52a rotates, the conveying roller 52, the rotation of which is synchronized with the conveying roller shaft 52a by the coupling member, rotates. Furthermore, when the conveying roller shaft 52a rotates, the driving force of the motor M is transmitted to the feed roller shaft 51a via a drive train 116, causing the feed roller shaft 51a to rotate. When the feed roller shaft 51a rotates, the feed roller 51, the rotation of which is synchronized with the feed roller shaft 51a by the coupling member, rotates.

Furthermore, between the frame that rotatably supports the conveying roller shaft 52a and the lifting and lowering plate 56, a spring 41 (a biasing member) is installed that applies a force to the lifting and lowering plate 56 in the direction of arrow K. In the present embodiment, the spring 41 is a compression coil spring, but other springs, such as a torsion coil spring, may also be used.

When the lifting and lowering plate 56 rotates, the feed roller 51 supported by the lifting and lowering plate 56 moves between an abutment position where the feed roller abuts the sheet S loaded in the manual feed tray 50, and a standby position where the feed roller is separated from the sheet S loaded in the manual feed tray 50 and waits for the start of feeding of the sheet S. The lifting and lowering plate 56 is controlled in its rotation by the cam member 80 via a release link 81 so as to move between the abutment position and the standby position.

A cam gear 83, which meshes with the conveyance gear 82, is attached to one end of the cam shaft 80a, which is the axis of rotation of the cam shaft 80a, and the cam gear 83 rotates along with the rotation of the conveyance gear 82.

As illustrated in FIG. 5, a one-way clutch 88 is press-fitted into the center of the cam gear 83.

The one-way clutch 88 transmits driving force to the cam shaft 80a when the cam gear 83 rotates in the R3 direction illustrated in FIG. 5, and idles without transmitting the driving force to the cam shaft 80a upon rotation in the R4 direction illustrated in FIG. 5. When the cam shaft 80a rotates, the cam member 80, the rotation of which is synchronized with the cam shaft 80a by the coupling member, rotates.

The separation roller 53 is rotatably supported by the separation roller shaft 53a. The separation roller shaft 53a is held against the separation holder 57 in a state where rotation is regulated. A torque limiter 54 is also attached to the separation roller shaft 53a, and the rotation of the separation roller shaft 53a and the torque limiter 54 is synchronized by a coupling member.

The separation holder 57 is rotatably supported by the frame. A spring 85 that applies a force to the separation holder 57 is provided between the separation holder 57 and the frame. The biasing force of the spring 85 causes the separation roller 53 to press against the conveying roller 52, thereby forming the separation nip portion.

<Standby Position>

Next, the forces that act on each member when the feed roller 51 is located in the standby position will be described. Here, the standby position is the position where the feed roller 51 stands by when the image forming apparatus A does not receive a job to feed a sheet S from the tray feeding portion 1, and where the feed roller 51 is separated from the sheet S. Note that, when the feed roller 51 is located in the standby position, the motor M that rotates the conveyance gear 82 and the cam gear 83 is stopped.

Figure 6:
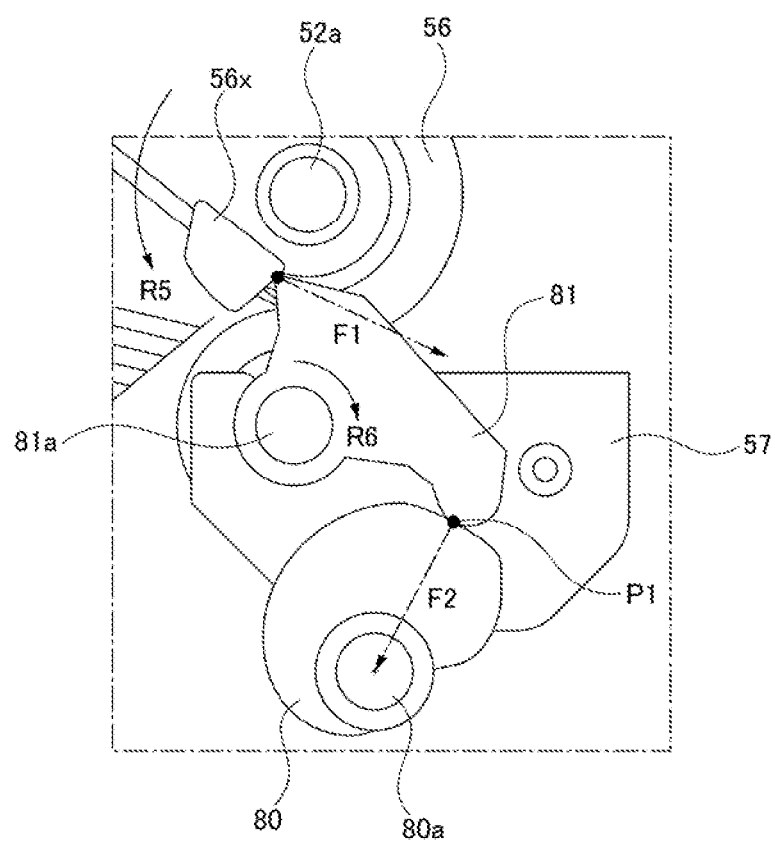
FIG. 6 is a cross-sectional schematic diagram of the area around the cam of the tray feeding portion according to the present embodiment.

FIG. 6 is a schematic diagram illustrating the forces acting on each member in an area E, illustrated in FIG. 4, when the feed roller 51 is located in the standby position. As illustrated in FIG. 6, when the spring 41 applies a force to the lifting and lowering plate 56 in the direction of arrow K (FIG. 4), which is the direction in which the feed roller 51 is oriented from the standby position toward the abutment position, the lifting and lowering plate 56 rotates about the conveying roller shaft 52a in the direction of arrow R5, and an abutment portion 56x of the lifting and lowering plate 56 moves to the side of the release link 81 and abuts the release link 81. That is, the spring 41 applies a force to the lifting and lowering plate 56 such that a force is exerted on the lifting and lowering plate 56 to cause the lifting and lowering plate 56 to rotate in the direction of the arrow R5.

When the abutment portion 56x of the lifting and lowering plate 56 abuts the release link 81, the abutment portion 56x of the lifting and lowering plate 56 presses the release link 81 using a force F1. A moment in the direction of arrow R6 centered on the release link shaft 81a, which is the axis of rotation of the release link 81, is thus generated. Due to the action of this moment, the release link 81 presses the point P1 of the cam member 80 using a force F2. Here, the force F2 is directed toward the center of the cam shaft 80a. Therefore, the moment to rotate the cam member 80 does not occur, and the cam member 80 stops.

<Feed Operation>

Next, a feed operation in the tray feeding portion 1 in which a sheet S loaded in the manual feed tray 50 is fed by the feed roller 51 will be described. The feed operation is started when a job is inputted to the controller C in a state where the sheet S is detected on the manual feed tray 50 by the sheet sensor.

When the feed operation is started, the controller C first controls the rotation of the motor M, thereby driving the motor M, and the conveyance gear 82 is rotated by this driving force in the direction of the arrow R2 illustrated in FIG. 5, and the cam gear 83, which meshes with the conveyance gear 82, rotates in the direction R3 illustrated in FIG. 5. Note that, in the feed operation, the motor M is driven at a constant rotation velocity.

As described above, when the conveyance gear 82 rotates in the direction of arrow R2, a driving force is not transmitted to the conveying roller shaft 52*a* due to the action of the one-way clutch 87, and the conveyance gear 82 idles. On the other hand, when the cam gear 83 rotates in the R3 direction, the driving force is transmitted to the cam shaft 80*a* by the action of the one-way clutch 88. This causes the cam shaft 80*a* to rotate, and the cam member 80 supported by the cam shaft 80*a* also rotates in the direction of arrow R3.

Figure 7:
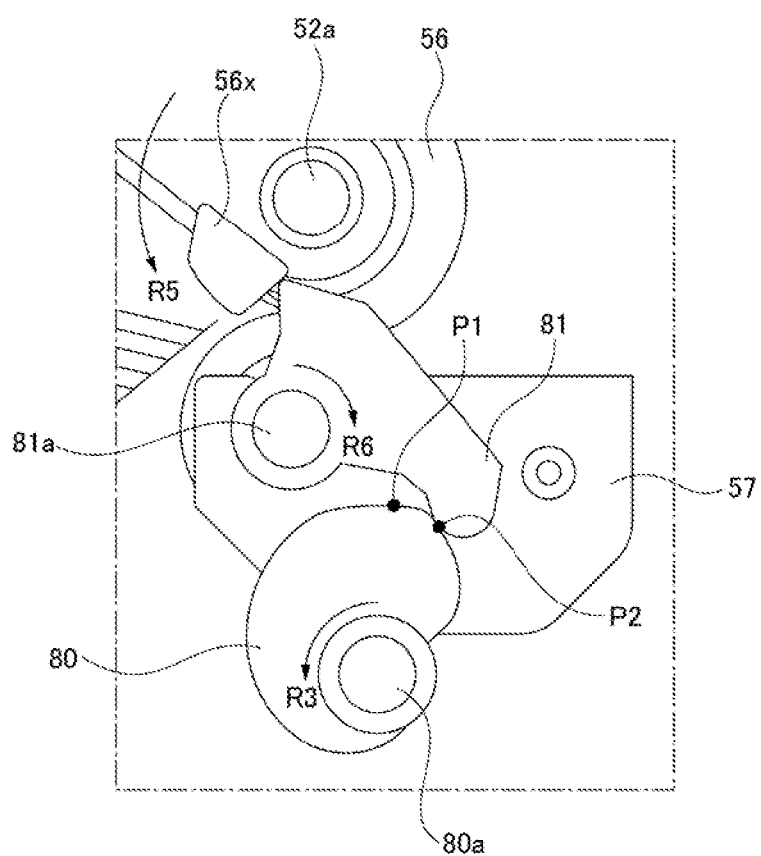
FIG. 7 is a cross-sectional schematic diagram of the area around the cam of the tray feeding portion according to the present embodiment.

FIG. 7 is an enlarged view of the area E illustrated in FIG. 4, and is a diagram illustrating the state immediately after the feed operation is started and the cam member 80 rotates in the direction of arrow R3. As illustrated in FIG. 7, when the cam member 80 rotates in the direction of arrow R3, the abutment point between the release link 81 and the cam member 80 shifts from point P1 to point P2, and the release link 81 rotates in the direction of arrow R6 about the release link shaft 81*a* along the surface shape of the cam member 80.

When the release link 81 rotates in the direction of arrow R6, the lifting and lowering plate 56 follows the rotation of the release link 81 in the direction of arrow R6 and rotates in the direction of arrow R5 due to the biasing force of the spring 41. As the lifting and lowering plate 56 rotates in the direction of arrow R5 in this manner, the feed roller 51 starts to descend (see FIG. 4).

Figure 8:
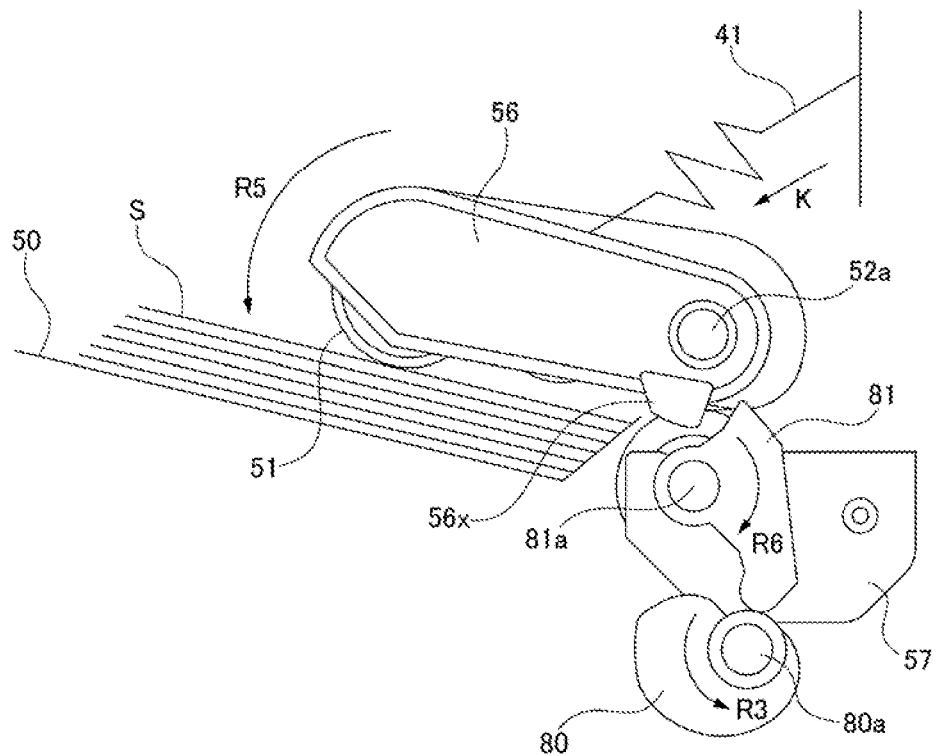
FIG. 8 is a cross-sectional schematic diagram of the tray feeding portion when the stacking portion according to the present embodiment is fully loaded with a sheet.

FIG. 8 is a diagram illustrating a state where the cam member 80 has rotated further in the direction of arrow R3 from the state illustrated in FIG. 7. As illustrated in FIG. 8, when the cam member 80 rotates further in the direction of arrow R3, the release link 81 also rotates further in the direction of arrow R6, the lifting and lowering plate 56 also rotates further in the direction of arrow R5, and the feed roller 51 descends further. The feed roller 51 thus abuts the sheet S loaded on the manual feed tray 50.

When the feed roller 51 abuts the sheet S, the rotation of the lifting and lowering plate 56 is regulated by the sheet S and rotation stops. On the other hand, because the cam member 80 is rotating, the release link 81 rotates in the direction of arrow R6 as the cam member 80 rotates, and the release link 81 is separated from the abutment portion 56*x* of the lifting and lowering plate 56.

Next, when the sensor detects the fact that the feed roller 51 has abutted the sheet S loaded in the manual feed tray 50, the controller C stops the driving by the motor M, and the rotation of the cam member 80 stops. Thereafter, the controller C reverses the motor M.

The conveyance gear 82 thus rotates in the direction of the arrow R1 illustrated in FIG. 5, and the driving force is transmitted to the conveying roller shaft 52*a* by the action of the one-way clutch 87, causing the conveying roller 52 and the feed roller 51 to rotate together with the conveying roller shaft 52*a*. The sheet S is fed in this manner by the feed roller 51. Note that, while the sheet S is being fed by the feed roller 51, the cam gear 83 rotates in the direction of the arrow R4 illustrated in FIG. 5, and hence the driving force of the motor M is not transmitted to the cam shaft 80*a* by the action of the one-way clutch 88, and the cam member 80 stops.

Furthermore, when the feed roller 51 abuts the sheet S loaded in the manual feed tray 50, the biasing force of the spring 41 acts as a force to push the feed roller 51 against the sheet S. By pressing the feed roller 51 against the sheet S in this way, the feed operation can be stabilized.

Figure 9:
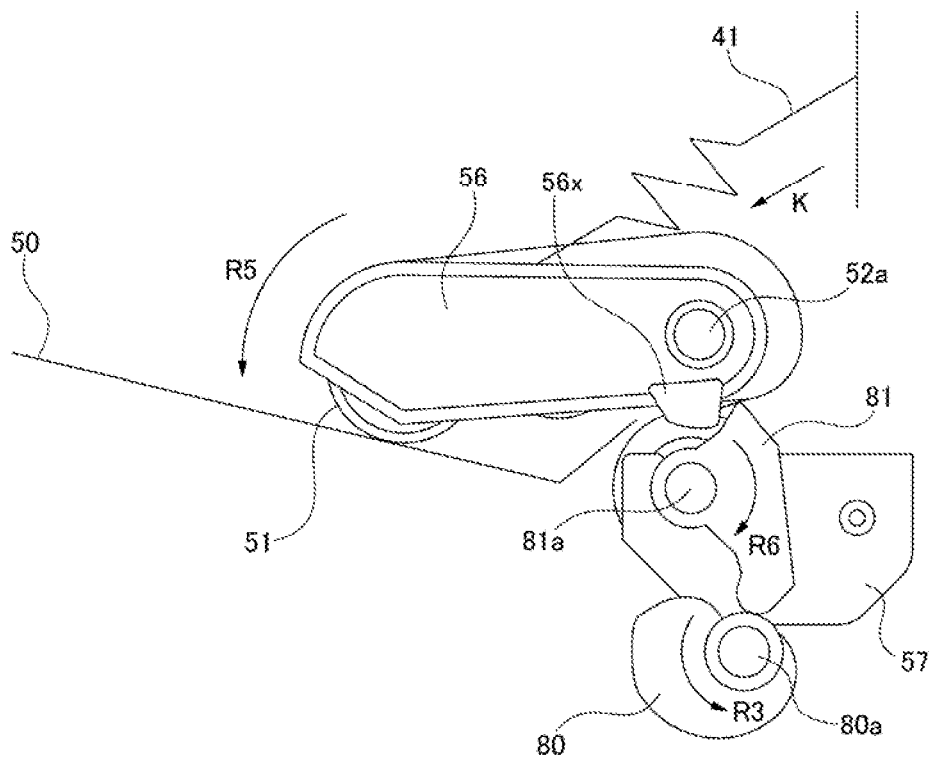
FIG. 9 is a cross-sectional schematic diagram of the tray feeding portion when the stacking portion according to the present embodiment has no sheet.

Further, as illustrated in FIG. 9, when all the sheets S on the manual feed tray 50 have been fed and there is no sheet S on the manual feed tray 50, the feed roller 51 abuts the manual feed tray 50. In this case also, the abutment portion 56*x* of the lifting and lowering plate 56 is separated from the release link 81.

In addition, when the feeding of the sheet S by the feed roller 51 is finished, the motor M is rotated forward and the cam member 80 is rotated in the direction of the arrow R3 by the driving force of the motor M. The release link 81 accordingly rotates in the direction opposite to the arrow R6, along the surface shape of the cam member 80, and the release link 81 again abuts the abutment portion 56*x* of the lifting and lowering plate 56.

Thereafter, when the release link 81 rotates further in the direction opposite to the direction of arrow R6 as the cam member 80 rotates in the direction of arrow R3, the release link 81 presses the abutment portion 56*x* of the lifting and lowering plate 56, and the lifting and lowering plate 56 rotates in the direction opposite to the direction of arrow R5 against the biasing force of the spring 41.

The feed roller 51 accordingly rises and returns to the standby position. Thereafter, when the sensor detects the fact that the feed roller 51 is located in the standby position, the controller C stops the driving by the motor M. Thus, the cam member 80 moves the lifting and lowering plate 56 from the abutment position to the standby position against the biasing force of the spring 41 by abutting the lifting and lowering plate 56.

<Moving Velocity of Feed Roller>

Next, the moving velocity of the feed roller 51 when the feed roller 51 descends from the standby position in order to feed the sheet S will be described.

In the present embodiment, when the feed roller 51 is lowered from the standby position in order to feed the sheet S, the rotation velocity of the cam gear 83 that rotates the cam member 80 is constant. Therefore, the velocity of descent of the feed roller 51 is controlled by the shape of the cam surface section where the cam member 80 and the release link 81 contact each another. Note that the velocity of descent of the feed roller 51 is affected by a combination of various factors such as the respective rotation center positions of the cam member 80 and the release link 81, the position of contact between the cam member 80 and the release link 81, and the pressure of the feed roller 51. In the present embodiment, the shape of the cam surface where the cam member 80 and the release link 81 contact each other is determined in view of the fact that the velocity of descent of the feed roller 51 increases when the instantaneous amount of rotational movement of the release link 81 is large.

Figure 10:
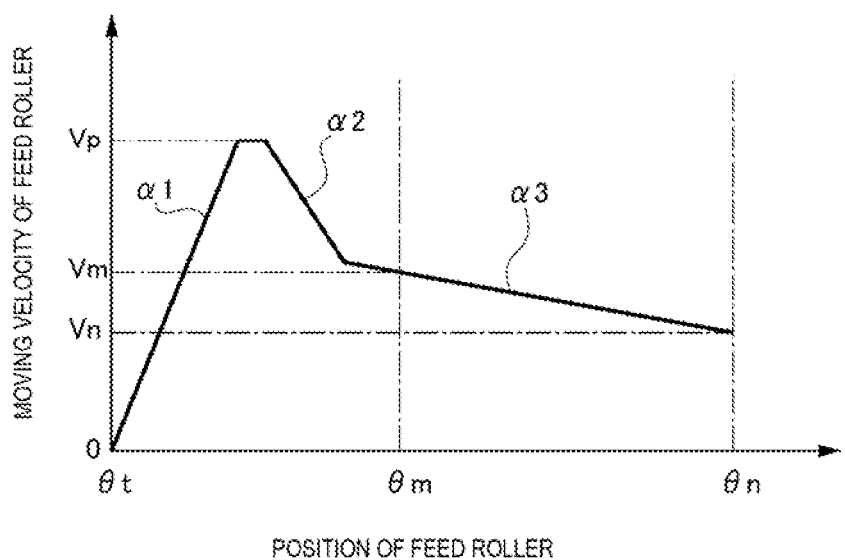
FIG. 10 is a graph illustrating the relationship between the moving velocity and the position of the feed roller when the feed roller descends from a standby position.

FIG. 10 is a graph illustrating the relationship between the moving velocity and the position of the feed roller 51 when the feed roller 51 descends from the standby position. The graph illustrated in FIG. 10 illustrates the moving velocity of the feed roller 51 when the feed roller 51 is lowered from the standby position to the position where the feed roller 51 abuts the manual feed tray 50 in a state where no sheet S is loaded in the manual feed tray 50.

Furthermore, the horizontal axis of the graph illustrated in FIG. 10 indicates the position of the feed roller 51 as the rotation angle of the lifting and lowering plate 56. The rotation angle of the lifting and lowering plate 56 here is the angle formed by the vertical direction N (FIG. 11), the rotation center of the lifting and lowering plate 56 (rotation center of the conveying roller shaft 52*a*), and the rotation center of the feed roller shaft 51*a*.

Figure 11:
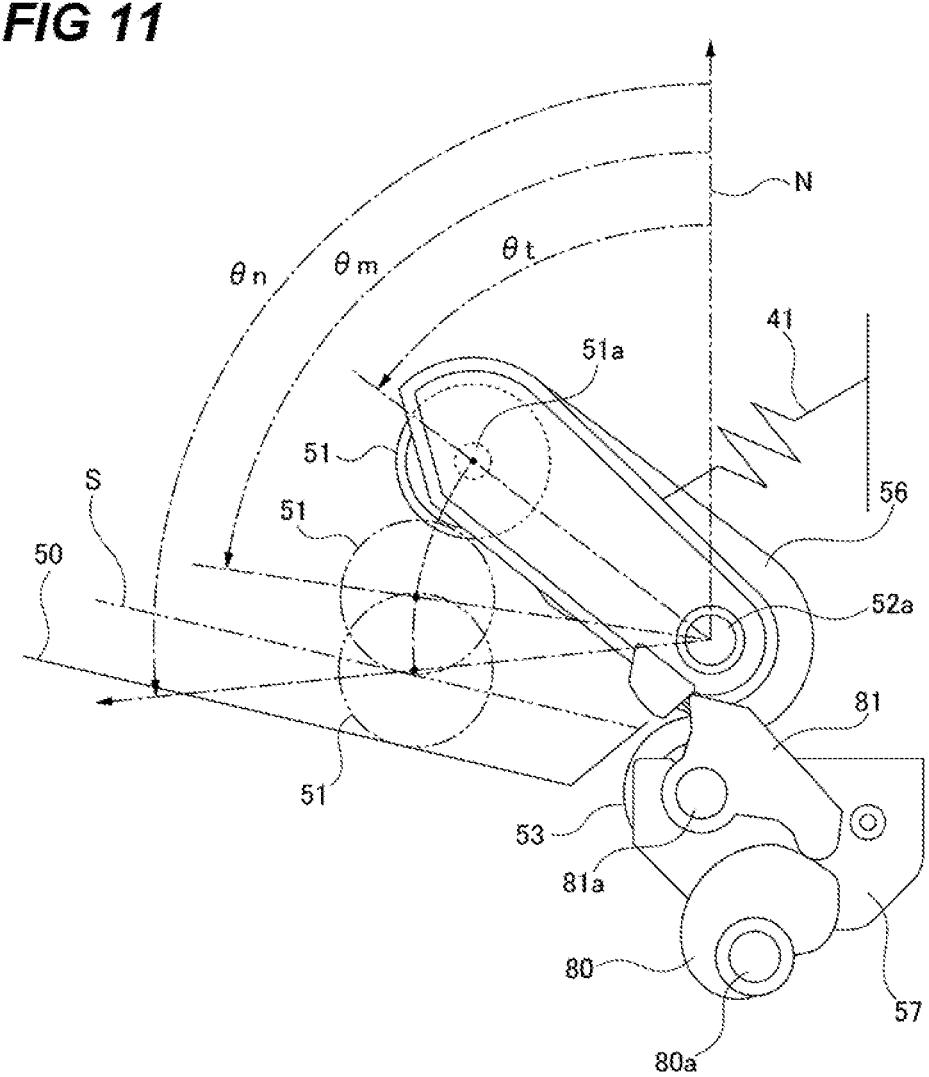
FIG. 11 is a cross-sectional schematic diagram of the tray feeding portion that illustrates the position of the feed roller according to the present embodiment.
Figure 12A:
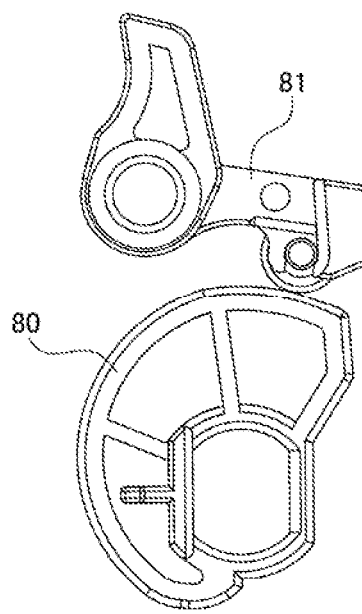
FIGS. 12A, 12B, 12C, and 12D are cross-sectional views of a cam and a cam follower in each feed roller position according to the present embodiment.
Figure 12B:
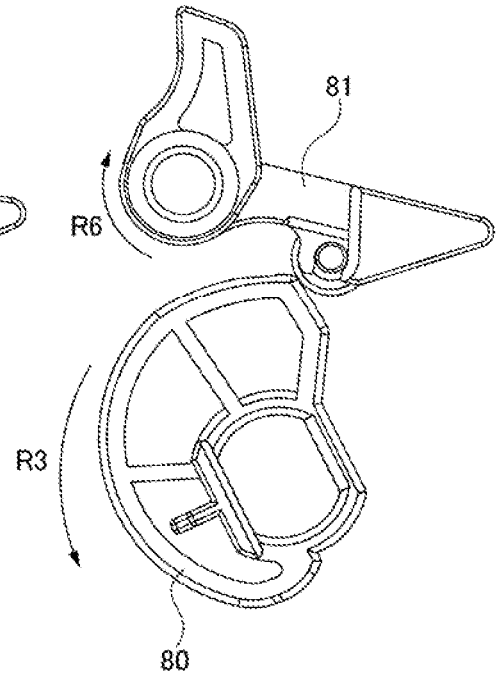

Specifically, as illustrated in FIG. 11, the angle θt is the rotation angle of the lifting and lowering plate 56 when the feed roller 51 is located in the standby position. The positional relationship between the cam member 80 and the release link 81 when the feed roller 51 is located in the standby position is illustrated in FIG. 12A. Further, the positional relationship between the cam member 80 and the release link 81 illustrated in FIG. 12B is the positional relationship between the cam member 80 and the release link 81 when the moving velocity of the feed roller 51 (described subsequently) reaches a maximum velocity Vp. The position of the cam member 80 illustrated in FIG. 12B is a position the cam member 80 attains by being rotated 25.5 degrees in the direction of arrow R3 from the position of the cam member 80 illustrated in FIG. 12A.

Figure 12C:
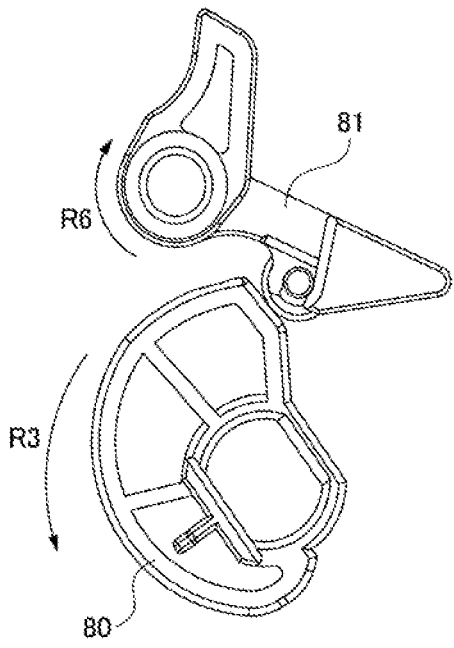

As illustrated in FIG. 11, the angle θm is the angle of rotation of the lifting and lowering plate 56 when the feed roller 51 is located in the full-load position where the feed roller 51 abuts the sheet S when the maximum amount of sheets S is loaded in the manual feed tray 50. The positional relationship between the cam member 80 and the release link 81 when the feed roller 51 is located in the full-load position is the positional relationship illustrated in FIG. 12C. The position of the cam member 80 illustrated in FIG. 12C is a position the cam member 80 attains by being rotated 35.3 degrees in the direction of arrow R3 from the position of the cam member 80 illustrated in FIG. 12A.

Figure 12D:
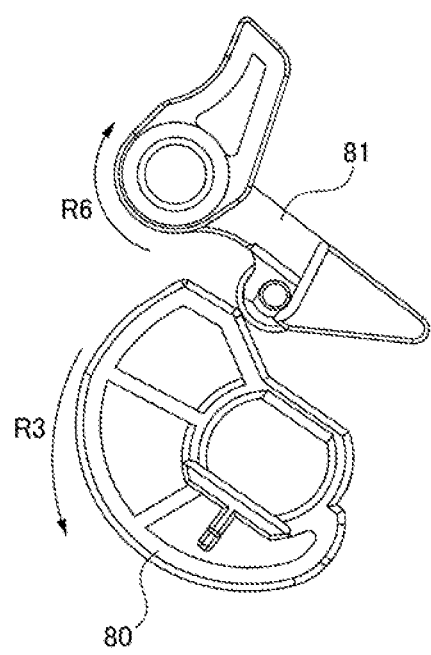

As illustrated in FIG. 11, the angle θn is the angle of rotation of the lifting and lowering plate 56 when the feed roller 51 is located in the tray position where the feed roller 51 abuts the manual feed tray 50. The positional relationship between the cam member 80 and the release link 81 when the feed roller 51 is located in the tray position where the feed roller 51 abuts the manual feed tray 50 is the positional relationship illustrated in FIG. 12D. The position of the cam member 80 illustrated in FIG. 12D is a position the cam member 80 attains by being rotated 54.0 degrees in the direction of arrow R3 from the position of the cam member 80 illustrated in FIG. 12A.

As illustrated in FIG. 10, when the feed roller 51 is located in the standby position, the feed roller 51 is stopped, and therefore the moving velocity of the feed roller 51 is zero. After the feed roller 51 starts to descend from the standby position, the feed roller 51 accelerates with an acceleration α1 and reaches a maximum velocity Vp (a second moving velocity) at the stage before reaching the full-load position (a first abutment position). After reaching the maximum velocity Vp, the feed roller 51 decelerates with an acceleration α2. Thereafter, just before reaching the full-load position, the feed roller 51 reduces its acceleration from the acceleration α2 to an acceleration α3, and reaches the full-load position at a velocity Vm (a first moving velocity) when the height of the sheet S loaded in the manual feed tray 50 is maximum. The velocity Vm is slower than the velocity Vp.

Thus, when the feed roller 51 descends from the standby position in order to feed the sheet S, the cam member 80 controls the rotation of the lifting and lowering plate 56 such that the moving velocity of the feed roller 51 is maximized at a position upstream in the movement direction of the feed roller 51 from the full-load position where the feed roller 51 is able to abut the sheet S. The feed roller 51 accordingly decelerates from the position with the maximum moving velocity to the full-load position, thus reducing the collision noise between the feed roller 51 and the sheet S. Furthermore, by maximizing the moving velocity of the feed roller 51 at a position where there is no possibility of the feed roller 51 abutting the sheet S, the productivity of the image forming apparatus A can be improved by causing the feed roller 51 to abut the sheet S quickly while suppressing collision noise.

Further, the feed roller 51 continues to descend while decelerating at the acceleration α3 until it reaches the tray position from the full-load position, and reaches the tray position at a velocity Vn (a third moving velocity). In other words, the moving velocity of the feed roller 51 while moving from the full-load position to the tray position is set to be slower than the moving velocity of the feed roller 51 in the full-load position. Therefore, when the minimum amount of sheets S is loaded in the manual feed tray 50 and the height of the sheet S loaded in the manual feed tray 50 is minimum, the moving velocity of the feed roller 51 while moving from the full-load position to the minimum position (second abutment position) where the feed roller 51 abuts the sheet S is also slower than the moving velocity of the feed roller 51 at the full-load position.

Thus, when the feed roller 51 descends from the standby position in order to feed the sheet S, the cam member 80 controls the rotation of the lifting and lowering plate 56 such that the moving velocity of the feed roller 51 during the movement of the feed roller 51 from the full-load position to the minimum position is slower than the moving velocity of the feed roller 51 at the full-load position. As a result, the moving velocity of the feed roller 51 is further decelerated when descending from the full-load position, such that the collision noise between the feed roller 51 and the sheet S can be effectively reduced even when the amount of the sheets S loaded in the manual feed tray 50 is small and the dampening effect of the sheet S is low.

Note that in the present embodiment, a configuration has been described in which the motor M is driven at a constant velocity and the moving velocity of the feed roller 51 when descending from the standby position is controlled by the shape of the cam member 80. However, the same advantageous effects as those described above can also be obtained with a configuration in which the rotation velocity of a motor M is controlled by the controller C that controls the motor M such that the moving velocity of the feed roller 51 when descending from the standby position is the aforementioned velocity.

Although the present embodiment describes a configuration in which the feed roller 51 is in close proximity to the manual feed tray 50, the present invention is not limited to this configuration. That is, in a configuration in which the manual feed tray 50 is close to the feed roller 51 such that the feed roller 51 and the sheet S abut each other, the same advantageous effects as those described above can be obtained by making the moving velocity of the manual feed tray 50 the same as the aforementioned moving velocity of the feed roller 51.

Furthermore, although the present embodiment illustrates a tray feeding portion 1 that feeds a sheet S from a manual feed tray 50 as a sheet feeding apparatus, the present invention is not limited thereto. That is, the same advantageous effects as those described above can be obtained by applying the configuration of the foregoing sheet feeding apparatus to the feed roller 3 that feeds the sheet S from the sheet cassette 2 in which the sheet S is loaded inside the image forming apparatus A.

Furthermore, although the present embodiment describes a configuration in which the sheet feeding apparatus is mounted in the image forming apparatus A, the present invention is not limited to this configuration. That is, the same advantageous effects as those described above can be obtained even when the sheet feeding apparatus of the present embodiment is configured to be mounted on an image reading apparatus having an image reading portion that reads the image of a sheet S.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-204731, filed Dec. 10, 2020, which is hereby incorporated by reference herein in its entirety.

What is claimed is:

1. A sheet feeding apparatus, comprising:
a stacking portion in which a sheet is loaded;
a feed roller that abuts the sheet loaded in the stacking portion and that feeds the sheet;
a rotating member that supports the feed roller and that rotates between an abutment position in which the feed roller abuts the sheet loaded in the stacking portion and a standby position in which the feed roller is separated from the sheet loaded in the stacking portion and waits to start sheet feeding;
a biasing member that applies a force to the rotating member in a direction in which the feed roller is oriented from the standby position toward the abutment position; and
a cam member that moves the rotating member between the abutment position and the standby position,
wherein the cam member controls the rotation of the rotating member by abutting the rotating member so as to move the rotating member against the biasing force of the biasing member from the abutment position to the standby position, and in a case where the height of the sheet loaded in the stacking portion is maximum when the feed roller moves from the standby position to the abutment position in order to feed the sheet, the feed roller abuts the sheet at a first abutment position at a first moving velocity slower than a second moving velocity at a position upstream in the movement direction of the feed roller from the first abutment position, and, in a case where the height of the sheet loaded in the stacking portion is minimum, the feed roller abuts the sheet at a second abutment position at a third moving velocity slower than the first moving velocity at the first abutment position.

2. The sheet feeding apparatus according to claim 1, further comprising:
a drive source that rotatably drives the cam member; and
a controller that controls the rotation of the drive source,
wherein the controller rotates the cam member at a constant velocity when the feed roller moves between the standby position and the abutment position.

3. The sheet feeding apparatus according to claim 1, wherein the cam member controls the rotation of the rotating member such that, when the feed roller moves from the standby position to a position of abutment against the stacking portion, the moving velocity from the first abutment position to the position of abutment against the stacking portion is slower than the first moving velocity in the first abutment position.

4. The sheet feeding apparatus according to claim 1, wherein the force applied by the biasing member to the rotating member is greater when the feed roller is located in the standby position than when the feed roller is positioned in the abutment position, and is greater when the feed roller is located in the first abutment position than when the feed roller is positioned in the second abutment position.

5. The sheet feeding apparatus according to claim 1, further comprising:
a regulating member that is provided so as to be slidable in a sheet width direction with respect to the stacking portion and that regulates a position of a lateral end of the sheet,
wherein a condition where the height of the sheet loaded in the stacking portion is maximum is a condition where the height from the sheet stacking surface of the stacking portion which the sheet feeding apparatus is capable of feeding is maximum, and a line indicating that the height of the sheet is maximum is provided to the regulating member.

6. An image forming apparatus, comprising:
the sheet feeding apparatus according to claim 1; and
an image forming portion that forms an image on a sheet fed by the sheet feeding apparatus.

7. An image reading apparatus, comprising:
the sheet feeding apparatus according to claim 1; and
an image reading portion that reads an image on a sheet fed by the sheet feeding apparatus.

* * * * *